E. E. KNITTLE.
FLY TRAP.
APPLICATION FILED JUNE 27, 1917.

1,256,329.

Patented Feb. 12, 1918.

WITNESSES

INVENTOR
E. E. Knittle,
BY Victor J. Evans
ATTORNEY

UNITED STATES PATENT OFFICE.

ELMER E. KNITTLE, OF ALLENTOWN, PENNSYLVANIA.

FLY-TRAP.

1,256,329.

Specification of Letters Patent. Patented Feb. 12, 1918.

Application filed June 27, 1917. Serial No. 177,330.

*To all whom it may concern:*

Be it known that I, ELMER E. KNITTLE, a citizen of the United States, residing at Allentown, in the county of Lehigh and State of Pennsylvania, have invented new and useful Improvements in Fly-Traps, of which the following is a specification.

This invention relates to traps especially adapted to be used for capturing flies and similar insects and it consists in the novel features hereinafter described and claimed.

An object of the invention is to provide a simple and efficient fly trap, one which is cheap to manufacture and one which may be easily and quickly cleaned and maintained in operative condition.

With this object in view the trap includes a foraminous cylindrical body having a closure at its upper end and provided in its lower portion with a cone shaped foraminous vestibule. The cylindrical body is provided at its lower end with posts which are provided with grooves and a tray or pan is provided at its upper edge with an outstanding flange which is adapted to be received in the grooves of the posts whereby the said tray or pan may serve as a support for the body of the trap. The tray or pan is intended to hold a bait as for instance sugar or any other cheap substance. The lower edge of the body is spaced from the upper edge of the pan.

In the accompanying drawings:—

Figure 1:
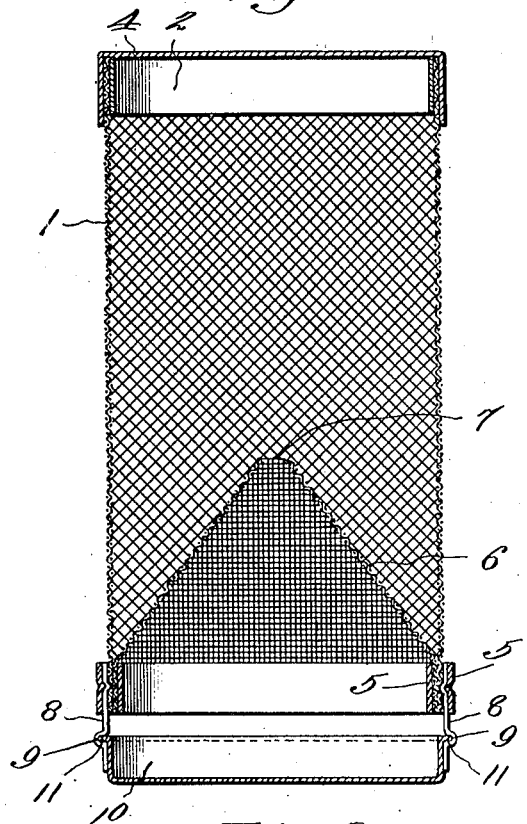
Figure 1 is a vertical sectional view of the fly trap.
Figure 2:
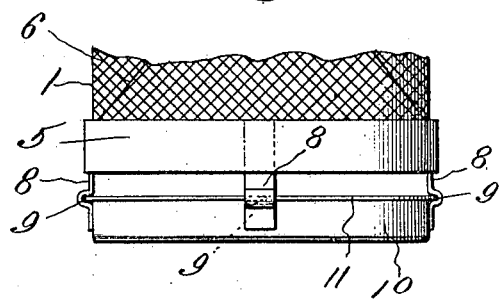
Fig. 2 is a fragmentary side elevation of the same.

The trap includes a cylindrical body 1 of foraminous material such as for instance wire netting. Strips 2 are applied to the inner and outer surfaces of the upper ends of the body 1 and serve to hold the said body in its cylindrical shape. A detachable cover 4 is mounted upon the upper end of the body 1. Strips 5 are applied to the inner and outer surfaces of the lower portion of the body 1 and assist in holding the said body in its cylindrical form or shape. A cone shaped foraminous vestibule member 6 is secured at its lower edge to the lower portion of the body 1 and the said vestibule member is provided at its center and at its upper end with an opening 7 of sufficient size to permit flies or similar insects to pass through the same. Posts 8 of sheet metal depend from the lower edge of the body 1 and are provided at points between their edges with grooves 9. A pan 10 is provided at its upper edge with an outstanding flange 11 which is adapted to be received in the grooves 9 of the posts 8 whereby the body 1 is supported upon the pan and the lower edge of the body 1 is held in a spaced position with relation to the upper edge of the said pan. The pan is intended to retain a bait as for instance sugar or any other similar material.

In operation the trap is placed upon a level surface whereby the pan 10 serves as a support for the body 1 and the flies as they approach the trap are lured by the bait and will pass over the edge of the pan to get at the same. After they have partaken of the bait to a sufficiency they will seek to make an escape from the pan and in the endeavor to do so they will observe the light coming from above through the body 1 and the vestibule 6 and hence they will move in an upward direction and pass through the opening 7 into the body 1 which serves as a pound for corralling the flies.

When it is desired to clean the trap it may be readily done by immersing the same in hot water and by separating the parts from each other and reassembling them in the order as shown and described.

From the foregoing description taken in conjunction with the accompanying drawing it will be seen that a fly trap of simple and durable structure is provided and that the same may be manufactured at such cheap cost as to render it available by persons with moderate means for entrapping flies and the like.

Having described the invention what is claimed is:—

A fly trap comprising a body of foraminous material, inner and outer strips serving to maintain the shape of the body, a closure for the upper end of the body, a cone shaped foraminous vestibule member located in the lower portion of the body, spring posts depending from the lower portion of the body, the adjacent portions of the body, the vestibule and the posts being located between the inner and outer strips whereby the strips clamp the said parts together and a tray detachably engaging the posts.

In testimony whereof I affix my signature.

ELMER E. KNITTLE.

Copies of this patent may be obtained for five cents each, by addressing the "Commissioner of Patents, Washington, D. C."